2 Sheets--Sheet 1.

W. A. MACK.

Sewing-Machines.

No. 6,118. Reissued Nov. 3, 1874.

Witnesses:
Parker H. Sweet, Jr.
Chas. E. Thorpe

Inventor:
William A. Mack
By his Atty J. E. Dwight

W. A. MACK.

Sewing-Machines.

No. 6,118. Reissued Nov. 3, 1874.

Witnesses:
Parker H. Sweet, Jr.
Chas. E. Thorpe

Inventor:
William A. Mack
By his Atty J. Ch. Dana Jr.

UNITED STATES PATENT OFFICE.

WILLIAM A. MACK, OF NORWALK, OHIO, ASSIGNOR TO THE DOMESTIC SEWING-MACHINE COMPANY.

IMPROVEMENT IN SEWING-MACHINES.

Specification forming part of Letters Patent No. 38,592, dated May 19, 1863; reissue No. 6,118, dated November 3, 1874; application filed May 15, 1874.

*To all whom it may concern:*

Be it known that I, WILLIAM A. MACK, of Norwalk, county of Huron and the State of Ohio, have invented new and useful Improvements in Sewing-Machines; and I do hereby declare that the following specification, taken in connection with the drawings furnished, is a full, clear, and exact description thereof, which will enable others skilled in the art to make and use the same.

My invention relates to the union of levers for operating the shuttle; to the construction of the shuttle; to the shuttle-race; and to the means for operating the feed-wheel.

Figure 1:
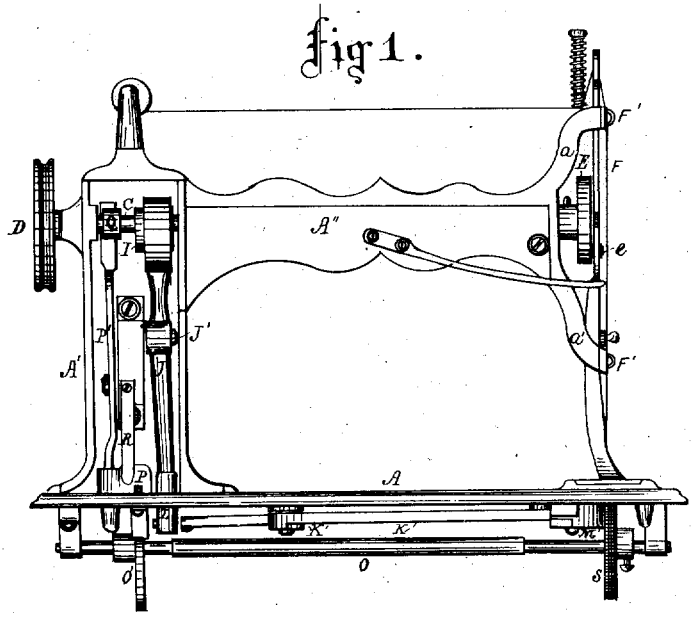
Figure 2:
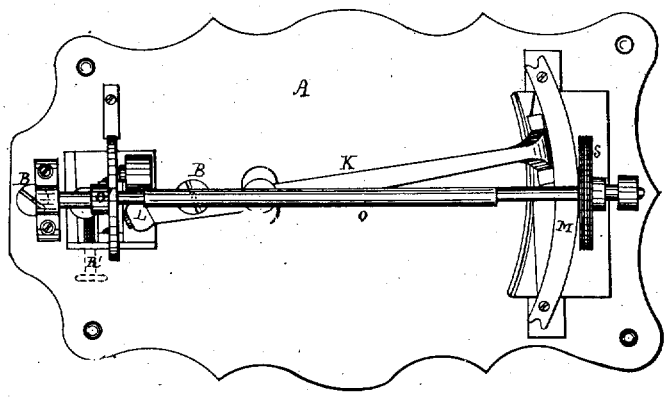
Figure 3:
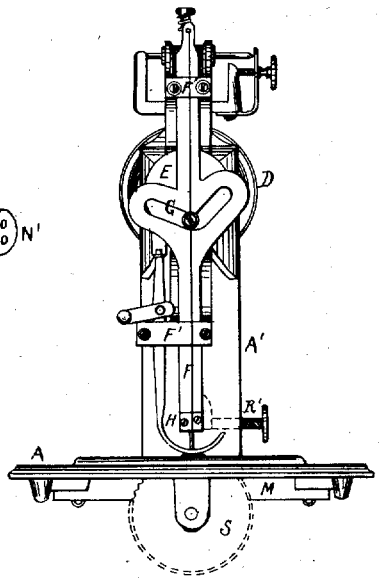
Figure 5:
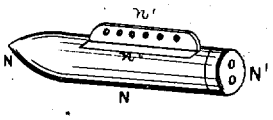
Figure 6:
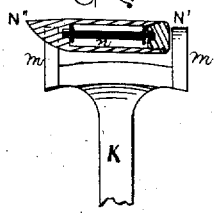
Figure 4:
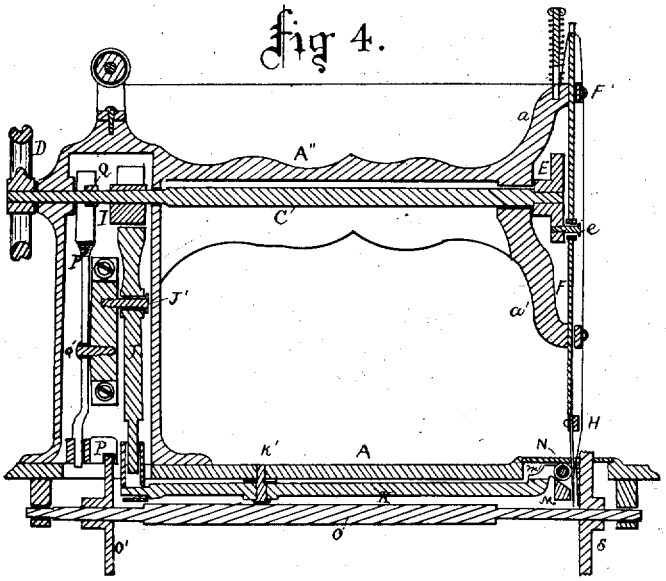

Referring to the drawings, Figure 1 represents a side elevation of a sewing-machine with details of my invention in position; Fig. 2, bottom view of same, showing the arrangement of feeding devices, shuttle-levers, &c.; Fig. 3, end view of same; Fig. 4, sectional view of machine divided through its center, showing details and the points of attachment and connection; Fig. 5, shuttle; Fig. 6, section of shuttle and its cradle, in which the former rests and is carried.

In the drawings, A A′ A″ represent the frame of a sewing-machine, which consists of a bed-plate, A, standard A′, and arm A″. This frame, when complete, with its details, is generally mounted upon a table. C represents a driving-shaft, which extends the entire length of the arm A″. At the extreme left, as seen in Figs. 1 and 4, is secured the balance-wheel or pulley. The front end of the arm A″ serves as the bearing for the needle-bar, &c., in which they are held and guided. These bearings are formed in the usual way. The needle-bar is about eight or ten inches in length, more or less. Its diameter or thickness is not essentially definite. I have represented the same as being about three-sixteenths of an inch in thickness by five-eighths of an inch in width, which is a suitable size. At or near the center of the latter is arranged an irregular groove or cam-slot, of a peculiar shape, forming an irregular rounded angle, (see drawings,) which gives the needle-bar a kind of intermittent motion—that is to say, the movement upward is steady and regular, while the downward stroke is quick at first, and upon reaching the lowest point suddenly rising a little to allow the nose of the shuttle to pass between the needle and thread, then again slightly downward, thus giving slack to the thread the moment the shuttle passes through the loop, and then quickly rising to draw in the slack and tighten the stitch. This intermittent motion of the needle-bar is very important, as it prevents the shuttle from breaking the needle-thread in its passage through the loop. The simultaneous movement of the shuttle is governed by devices hereinafter described. The needle is secured to the needle-bar by means of the screw-clamp H. Upon the shaft C, within the standard A′, is secured an eccentric, I, so arranged upon the shaft as to cause the shuttle-arm to vibrate at the right moment to pass the shuttle through the loop, as above described. The motion forward, being given when the body of the eccentric is nearest to the pin J′, is more rapid than on its return when the body of the eccentric is up; consequently the movement of the shuttle forward is more rapid than upon its return, and by this accelerated forward motion, as compared with the backward movement, the passage of the shuttle through the loop is much facilitated.

The movement of the shuttle is produced by means of two levers, J and K. The lever J is pivoted to the standard A′ at about one-third of its distance above the middle of the lever, as shown. The upper end of this lever is provided with an opening, and is represented in the drawings as forked, embracing the eccentric I, by which it is actuated. Means are interposed at the junction of the levers J and K for the purpose of maintaining freedom of action in any position assumed during the vibrations of the latter, and at the same time admit of an even uniform bearing, without cramping at the points of union, the object being to arrange bearings to slide and yield in the proper direction, to insure decided movements—a feature highly important and necessary to insure perfect operation of parts and prevent the missing of stitches. The device for this purpose, which is represented in the drawings, is provided with an "end" and a transverse opening, in which the ends of the levers are properly fitted and capable of being reversed in position, producing the same result. The lever K is pivoted to the under side of the bed-plate A at a distance of about one-third of its length, more or less, from the points of union with the other. The long end extends forward to or near the shuttle-race *m*. At this point of the shuttle-lever parts are extended to the right and left, thereby forming what is termed the cradle of the shuttle. These ears, which are secured to the lever, sweep around within the shuttle-race and move the shuttle back and forth in the working of the machine. The shuttle-race *m* consists of a curved trough, embracing in extent about one-sixth of a circle, more or less, whose center is in the pin *k'*. The shuttle is about two inches long by one-half inch in diameter, more or less, made of metal, and formed hollow or cylindrical, with an opening at its heel, provided with a cap, which is held in position by a thread formed thereon. A narrow slit or opening, through which the bobbin-thread passes, is arranged adjacent to and in line with the perforated rib, and nearly the same length of the latter. The inner part of said cap, as well as the opposite end of the shuttle, is provided with central bearings, in which the journals of the bobbin rest and rotate. Formed upon or secured to the upper margin of the shuttle is a rib provided with a sufficient number of small holes, smoothly finished, through which the thread is rove as it passes from the bobbin, (which is within,) to give sufficient tension without the aid and application of end or inner springs to assist for that purpose. End pressure-springs and friction-brakes, as applied more or less to the shuttle-bobbins, allow the thread to reel off more freely when the spool is full than when nearly off, being a steady increase of tension from the commencement to the end, and the same rule applies to spools placed within a shuttle without journals. It is obvious that the bobbin should be allowed the utmost freedom of action without friction to insure uniform regularity from the commencement of the unwinding of the thread to the end, leaving all the work to be performed independent of the bobbin. The shuttle, when placed in position, inclines against the shuttle-race, partially supported by the shuttle carrier or cradle, as shown in Figs. 6 and 7, the ears *m m* preventing the shuttle from being thrown into an abnormal position by any sudden movement of the carrier. The shaft of the feeding apparatus is shown at O. This shaft extends the whole length of the feed-plate. Beneath the standard A' is attached a driving-wheel, O'. This is operated by a gripe, P, upon the lower end of the vibrating lever P'. The gripe P has a slot upon its lower edge, into which the edge of the wheel O' passes, as shown in Fig. 4, in which the wheel can move freely, while the gripe remains at right angles with its face. The lower end of the lever P' passes loosely through a round hole in the outer end of the gripe P, and thus forms an articulation. Now, when the cam Q, by the revolution of the shaft C, forces the upper end of the arm from the shaft C, the lower end, at the same time or instant, moves the outer end of the gripe P in the opposite direction, causing it to gripe or bind upon the face of the wheel O', and thus rotating it at a distance corresponding with the movement of the lower end of the lever P'. The action of the spring R is to carry the gripe P back as far as the width of the slot will allow, and to hold the gripe obliquely upon the wheel. The spring R prevents the wheel O' from turning backward, while it does not retard its forward movement. The upper end of this lever is operated by means of a cam, Q, upon the shaft C, which causes a vibrating motion of the lever upon the pin Q', and thus operating the gripe P upon the wheel O' at each revolution of the shaft C. The gripe P is carried back upon the face of the wheel O' by means of the spring R, which presses upon the back side of the gripe, and carries it upon the wheel to its proper position for a new hold. The extent of the movement of the gripe upon the wheel O' is governed by a set-screw, R', against which the lower end of the lever P' rests. Upon the outer end of the shaft O is secured a burr-wheel, S, which passes through the bed-plate A close in front of the needle, and by its motion, which coincides with the wheel O', gives motion to the cloth, in order to form the stitches.

The cam Q is so adjusted upon the shaft C that the feed is moved forward while the needle-bar is up.

By means of the set-screw R', which governs the extent of motion of the lever P', the length of the stitch can be regulated even while the machine is in motion.

The devices for holding the spool, taking up the slack thread as the needle rises, and for holding down the cloth, are of common forms, and which it is not necessary here to describe.

What I claim as my invention, and desire to secure by Letters Patent of the United States of America, is—

1. The combination of the eccentric I, embraced by the prongs of a centrally-pivoted forked vibrating lever, and a connecting horizontally-arranged lever, constructed and provided with ears for the purpose of actuating the shuttle, substantially as set forth.

2. The combination of the eccentric I, the centrally-pivoted forked actuating-lever, and a connecting horizontally-arranged shuttle-carrying lever with a shuttle and race or guide, substantially as set forth.

3. In a sewing-machine, the combination of the forked vertical lever and horizontal shuttle-carrying lever, when connected together to maintain a uniform bearing at their junction during their vibration, substantially as set forth.

4. The universal joint formed by interposing the sliding device at the junction of the vertical and horizontal levers, whereby a uniform bearing is maintained during their vibration, substantially as set forth.

5. The lever P′, gripe P, spring R, and wheel O′, when arranged and operated substantially as and for the purposes set forth.

6. A shuttle provided with a threaded cap and centrally-arranged openings for the admission and support of its bobbin-journals and the perforated rib, whereby the tension is applied, substantially as described.

W. A. MACK.

Signed in presence of—
J. A. WILLIAMSON,
A. B. GRIFFIN.